(12) United States Patent
Leijon et al.

(10) Patent No.: US 7,518,259 B2
(45) Date of Patent: Apr. 14, 2009

(54) ASSEMBLY COMPRISING A WATER TURBINE AND A GENERATOR, THE ROTOR OF WHICH IS DIRECT-CONNECTED TO EACH ONE OF THE BLADES OF THE TURBINE

(75) Inventors: Mats Leijon, Uppsala (SE); Hans Bernhoff, Uppsala (SE); Erik Segergren, Uppsala (SE)

(73) Assignee: Current Power Sweden AB, Västerås (SE)

( * ) Notice: Subject to any disclaimer, the term of this patent is extended or adjusted under 35 U.S.C. 154(b) by 259 days.

(21) Appl. No.: 10/598,282

(22) PCT Filed: Mar. 10, 2005

(86) PCT No.: PCT/SE2005/000346

§ 371 (c)(1),
(2), (4) Date: Aug. 23, 2006

(87) PCT Pub. No.: WO2005/088119

PCT Pub. Date: Sep. 22, 2005

(65) Prior Publication Data

US 2007/0164570 A1    Jul. 19, 2007

(30) Foreign Application Priority Data

Mar. 16, 2004    (SE) .................................... 0400667

(51) Int. Cl.
*F03D 9/00*    (2006.01)
(52) U.S. Cl. ....................................................... 290/54
(58) Field of Classification Search .................... 290/54
See application file for complete search history.

(56) References Cited

U.S. PATENT DOCUMENTS

| 1,835,018 | A | | 12/1931 | Darrieus |
| 2,112,889 | A | * | 4/1938 | Grondahl ..................... 415/141 |
| 2,428,515 | A | * | 10/1947 | Courson ...................... 416/119 |
| 2,428,816 | A | * | 10/1947 | Sigmund et al. .............. 310/86 |
| 4,045,148 | A | * | 8/1977 | Morin .......................... 416/84 |
| 4,129,786 | A | | 12/1978 | Miller |
| 4,368,392 | A | * | 1/1983 | Drees .......................... 290/54 |
| 4,424,451 | A | * | 1/1984 | Schmidt ....................... 290/54 |
| 4,477,690 | A | * | 10/1984 | Nikitin et al. .............. 174/15.6 |
| 4,520,273 | A | * | 5/1985 | Rowe ........................... 290/54 |
| 4,737,070 | A | | 4/1988 | Horiuchi et al. |
| 4,748,808 | A | * | 6/1988 | Hill ............................. 60/398 |
| 4,832,569 | A | | 5/1989 | Samuelsen et al. |
| 4,872,805 | A | * | 10/1989 | Horiuchi et al. ................ 415/7 |
| 5,545,853 | A | * | 8/1996 | Hildreth ................. 174/120 R |
| 5,947,678 | A | * | 9/1999 | Bergstein .................... 415/3.1 |
| 6,369,470 | B1 | * | 4/2002 | Kylander et al. .............. 310/52 |

(Continued)

FOREIGN PATENT DOCUMENTS

EP    1096144 A2 *    5/2001

(Continued)

*Primary Examiner*—Joseph Waks
(74) *Attorney, Agent, or Firm*—Dykema Gossett pLLC

(57) ABSTRACT

An assembly includes a water turbine and a rotary electrical generator, the rotor of which is connected to the turbine. The turbine has at least three axially directed blades, each blade being individually directly connected to the rotor of the generator.

16 Claims, 3 Drawing Sheets

U.S. PATENT DOCUMENTS

| | | | | |
|---|---|---|---|---|
| 6,376,775 B1 | * | 4/2002 | Leijon et al. | 174/128.1 |
| 6,417,578 B1 | * | 7/2002 | Chapman et al. | 290/44 |
| 6,768,218 B2 | * | 7/2004 | Yumita | 290/54 |
| 6,913,435 B2 | * | 7/2005 | Seki | 415/4.1 |
| D508,893 S | * | 8/2005 | Kato et al. | D13/115 |
| 7,199,484 B2 | * | 4/2007 | Brashears | 290/54 |
| 2003/0030283 A1 | * | 2/2003 | Lusk | 290/44 |
| 2003/0137149 A1 | * | 7/2003 | Northrup et al. | 290/44 |
| 2003/0164248 A1 | * | 9/2003 | Kulig et al. | 174/DIG. 32 |
| 2003/0193198 A1 | * | 10/2003 | Wobben | 290/54 |
| 2005/0285407 A1 | * | 12/2005 | Davis et al. | 290/54 |

FOREIGN PATENT DOCUMENTS

| | | | |
|---|---|---|---|
| EP | 1885047 A1 | * | 2/2008 |
| GB | 2050525 A | * | 1/1981 |
| SU | 1617180 A | * | 12/1990 |
| WO | 03/016714 | | 2/2003 |
| WO | WO 03058059 A1 | * | 7/2003 |

* cited by examiner

ASSEMBLY COMPRISING A WATER TURBINE AND A GENERATOR, THE ROTOR OF WHICH IS DIRECT-CONNECTED TO EACH ONE OF THE BLADES OF THE TURBINE

FIELD OF THE INVENTION

The present invention relates to an assembly that includes a water turbine and a rotary electrical generator, the rotor of which is connected to the turbine, which turbine includes a set of blades of at least three axially-directed blades.

BACKGROUND OF THE INVENTION

The present invention is primarily, but not solely, intended for applications of production of electrical energy from underwater currents in seas and water-courses. Sea currents can be caused by tidal water, temperature or saline differences, the Coriolis force of the rotation of the earth such as, e.g., the Gulf Stream or of level difference, e.g., on each side of sounds.

The flow velocity of the water in sea currents is usually fairly moderate, i.e., typically just a few m/s and may amount to 5 m/s at the most. The flow velocity in unregulated water-courses is normally of the same magnitude but may in rapids increase up to 10-15 m/s.

Presently, the energy source offered by underwater currents is very little utilized for the generation of electricity. This depends above all on difficulties to achieve economically competitive technology for the same. In this connection, one of the problems is the low flow velocity. The utilization of energy from such flows entails that turbines having low number of revolutions and high torque have to be used.

In these conditions, an expedient turbine type is such a one that has axially directed blades. Conventionally, such a one is formed with the blades thereof connected to a shaft via substantially radially directed stays, which shaft in turn is connected to the rotor of the generator. In applications when a turbine of relatively large dimensions is required, the stresses on the structure carrying the blades become large. This may involve risk of distortions and oscillations in constructions, which may lead to deteriorated geometry of the setting of the blades with accompanying deteriorated efficiency. This may be especially sensitive if the water flow that drives the turbine is unstable, i.e., that fluctuations occur in the velocity and direction of the flow. This may be the case, e.g., in certain types of underwater currents where wave motions on the surface and tidal water affect a flow being stable in other respects. Furthermore, the requisite load-carrying structure makes the turbine complicated and ungainly.

The object of the present invention is to obviate or at least reduce these problems.

SUMMARY OF THE INVENTION

The object set up has been attained by the fact that an assembly includes the special feature that each blade is individually directly connected to the rotor of the generator.

By the fact that the blades are carried directly by the rotor, the need for a particular load-carrying structure for the same is eliminated. The rotor, which normally is a relatively solid and robust body, ensures good support to the blades at least at one end of the same. Thereby, the blades get more well-defined and stable positions. Furthermore, the total complexity of the assembly is reduced by the fact that the load-carrying structure becomes much simpler and consists to a large extent of a component that anyway is present for other reasons. Therefore, an assembly according to the invention becomes very advantageous in situations where a large assembly is required and where the conditions of flow not always are stable.

According to a preferred embodiment of the assembly, the turbine comprises a first group of blades directed towards a first direction from the rotor and a second group of blades directed towards the opposite direction from the rotor, where each group comprises at least three blades.

This entails the advantage of the entire assembly having a symmetry that is favorable as regards carrying the different types of occurring forces. The bidirectional arrangement also enables each blade to be made shorter, which gives increased shape stability to the part of each blade that is farthest from the attachment in the rotor. Alternatively, a turbine having larger total axial length may be provided.

According to an additional preferred embodiment, each blade in the first group is arranged in alignment with a blade in the second group. Thereby, the symmetry of the assembly is additionally increased with even more stable operation characteristics as a consequence.

According to an additional preferred embodiment, blades that are located in coalignment are directly mechanically connected to each other. Thereby, the advantage is attained that the blades stabilize each other in pairs by the fact that bending forces on one of the blades are carried by bending forces on the other.

According to an additional preferred embodiment, each blade is stayed by means of stay means. Although the assembly according to the invention in principle eliminates the need for the staying apart from the one that is obtained directly from the rotor, it may frequently be advantageous to provide the blades with supplementing staying in order to improve the stability of the blades. However, the stay means therefor can be considerably simpler and weaker than in a conventional turbine where the blades entirely are carried by a stay construction. This is thanks to the blades primarily being carried by and getting steadiness from the rotor.

According to an additional preferred embodiment, the stay means comprises elements that connect blades to each other. Thereby, staying is attained in a simple way.

According to a preferred embodiment, said elements are directed radially inward from the respective blade and connected to each other with the radially innermost ends thereof. According to an alternative preferred embodiment, the elements extend between each blade adjacent in the circumferential direction.

Both these alternatives entail that the staying becomes stable with a relatively simple constructive design of the elements forming the stay means.

According to an additional preferred embodiment, each blade is connected to the rotor via a joint device. Thereby, it is attained that transfer of harmful bending moments and torque to the rotor from the blades can be limited.

According to an additional preferred embodiment, the rotor comprises permanent magnets, whereby the same becomes robust and insensitive to operational disturbances in the electromagnetic transformation of energy.

According to an additional preferred embodiment, the stator is encapsulated in a waterproof house. Thus, in an expedient way the generator becomes adapted to act in a submarine environment.

According to an additional preferred embodiment, the rotor is located radially outside the stator and in the same axial plane as the stator. Thereby, the assembly becomes compact in the axial as well as radial direction.

According to an additional preferred embodiment, the stator is wound with a high-voltage cable provided with a core of a conducting material, a first layer of semiconducting material surrounding the conducting material, a layer of insulating material surrounding the first layer and a second layer of semiconducting material surrounding the insulating material.

By means of a winding of this kind, it is made possible to manage the induction of current of very high voltage, thanks to the surrounding electrical field becoming homogeneous. By the fact that the current thereby can be kept lower, losses and heat release decrease.

According to an additional preferred embodiment, the stator of the generator is rotatable and connected to a turbine arranged to rotate the stator in the opposite direction to the rotor.

The electromotive force, E, that is induced in a coil is determined according to Farraday's law from the relation $$E = -N\frac{d\phi}{dt}$$

where N is the number of turns and $\phi$ the magnetic flow. This means that in a slowly running rotor, $$\frac{d\varphi}{dt}$$

becomes small and results in a small induced electromotive force. By the fact that also the stator rotates and that the direction of the rotation thereof is counter-directed the direction of the rotor, the relative motion between rotor and stator will be the sum of the rotary speed thereof. Thereby, the term $$\frac{d\phi}{dt}$$

will increase correspondingly. Thus, if the stator rotates by the same velocity as the rotor, the term will be doubled, resulting in a doubled induced electromotive force in comparison with in a stationary stator.

According to an additional advantageous embodiment, the stator is wound for three-phase.

The advantages of the invented assembly are especially valuable when the assembly is utilized for the production of energy from underwater currents.

Therefore, a second aspect of the invention consists of a use of the invented assembly for the generation of electric current from underwater currents.

The invention is explained closer by the subsequent detailed description of advantageous embodiment examples of the same, reference being made to the appended drawing figures.

DESCRIPTION OF ADVANTAGEOUS EMBODIMENT EXAMPLES OF THE INVENTION

Figure 1:
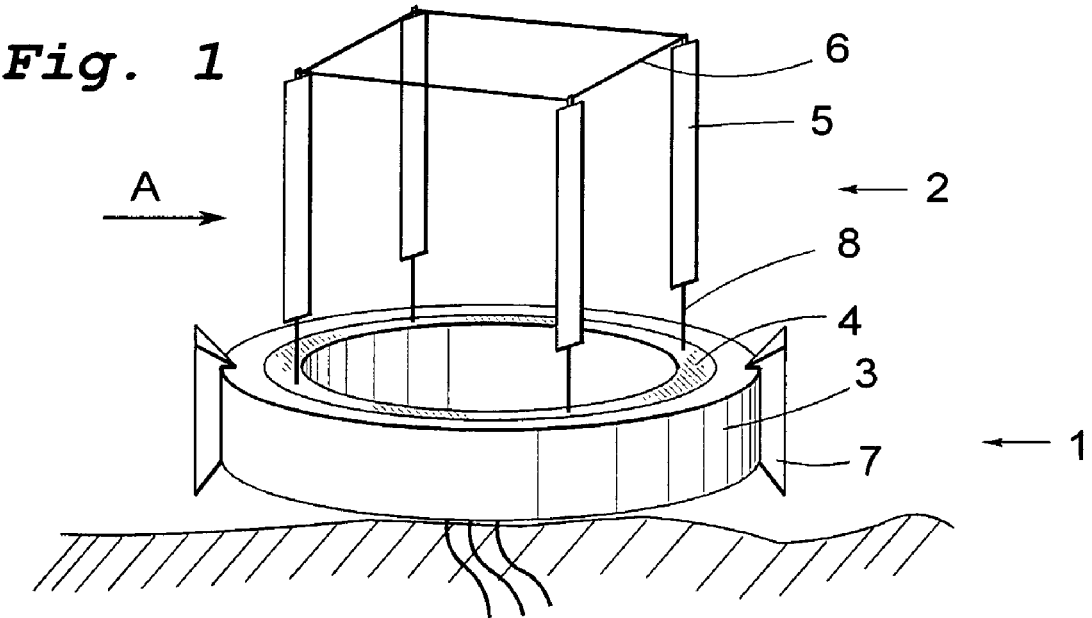
FIG. 1 is a schematic perspective view of a first embodiment example of the invention.

FIG. 1 is a schematic perspective view of a first example of an assembly according to the invention. The assembly consists of a generator 1 and a turbine 2, the turbine being axially offset along an imaginary axis defined by the generator. The generator 1 has an external stator 3 arranged in a frame 7, which rests on the bottom of the sea. The respective shaft 8 of four axially-directed blades 5 of the turbine 2 is fastened to the internal rotor 4. At the ends thereof remote from the rotor 4, the blades 5 are stayed by means of four stays 6, each of which extends between two adjacent blades 5. An underwater current A brings the turbine 2 to rotate and hence also the rotor 4, current being induced in the windings of the stator. Outgoing cables indicate that it is a matter of three-phase. Alternatively, the blades may of course be downwardly directed from the rotor.

Figure 2:
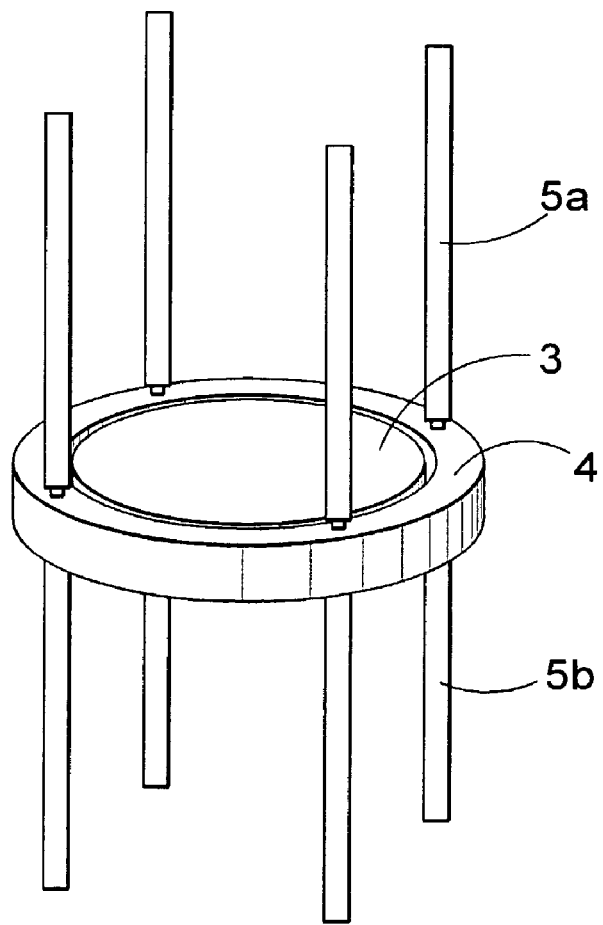
FIG. 2 is a schematic perspective view of a second embodiment example of the invention.

In the embodiment example according to FIG. 2, the rotor 4 is radially located outside the stator 3. The stator is carried by a stand (not shown), which rests on the bottom of the sea. To the rotor, two groups of blades 5a, 5b are fastened directed towards the axially opposite direction. Each blade 5a in the first group is arranged in alignment with a blade 5b in the second group. Each opposite pair of blades 5a, 5b is united to each other.

Figure 3:
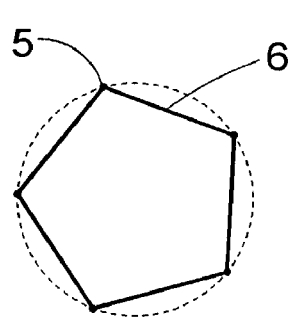
FIGS. 3-5 are schematic end views of different examples of the turbine design according to the invention.
Figure 4:
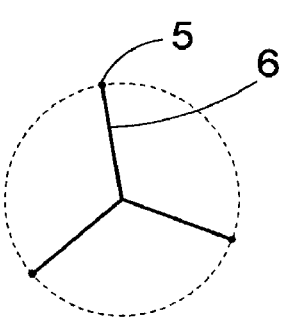
Figure 5:
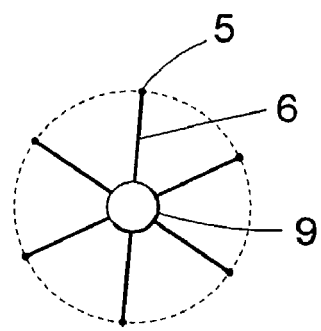

In FIGS. 3-5, it is illustrated in end views of different examples of how the blades having the ends thereof turned from the rotor may be stayed at each other. In the example according to FIG. 3, the turbine has five blades 5 and the arrangement of stays corresponds in principle to the one shown in FIG. 1.

In FIG. 4, where the turbine has three blades 5, the stays 5 are radially directed and are connected to each other in the centre.

In FIG. 5, where the turbine has six blades 5, the stays 5 are radially directed as in FIG. 4, but here they are connected to a centrally arranged ring-shaped staying element 9.

Figure 6:
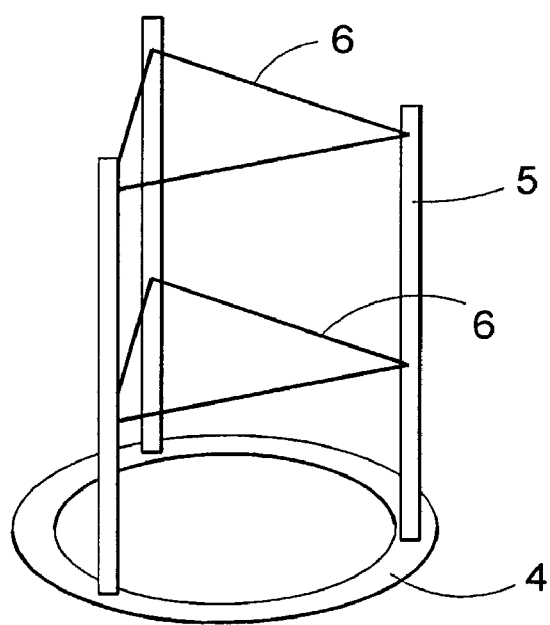
FIG. 6 is a schematic perspective view of the turbine according to an additional embodiment example of the invention.

Alternatively, the stays 5 may of course be arranged a distance in from the ends of the blades. Furthermore, a plurality of axially distributed stays may be arranged. One such embodiment is illustrated in FIG. 6.

Figure 7:
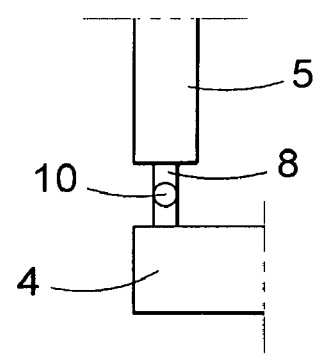
FIG. 7 illustrates a detail of the invention according to an additional embodiment example.

FIG. 7 illustrates jointed attachment of a blade 5 with the shaft 8 thereof being fastened to the rotor 4 via a joint device 10.

Figure 8:
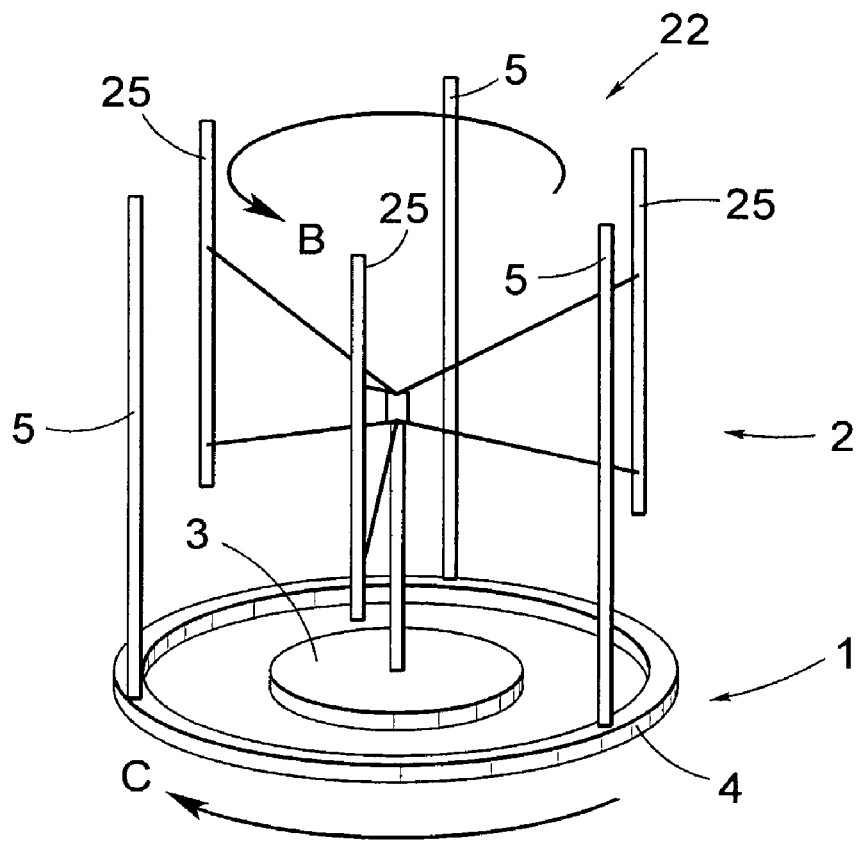
FIG. 8 is a schematic perspective view of an additional embodiment example of the invention.

FIG. 8 illustrates an alternative embodiment example having an external rotor 4 against three blades 5 on the turbine 2 and an internal stator 3. Here, the stator is arranged to rotate and is connected to a turbine 22 having three blades 25. The blades 25 of the stator turbine are angled in such a way that the stator will rotate in the opposite direction B to the direction of rotation C of the rotor.

Figure 9:
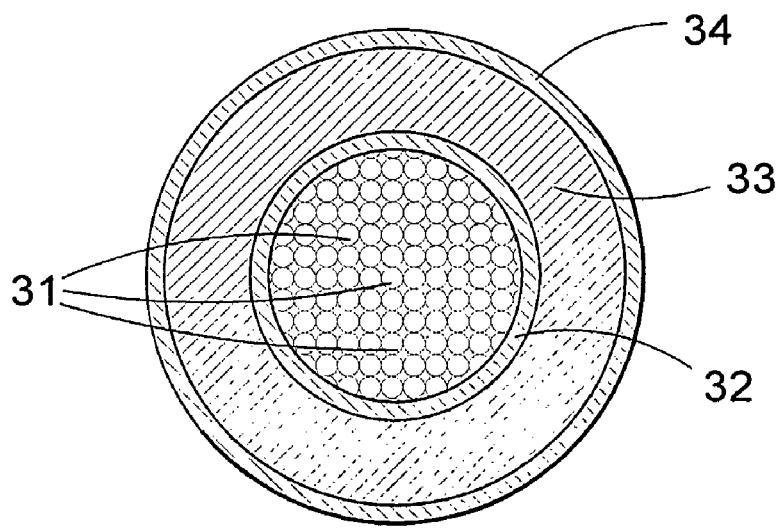
FIG. 9 is a cross-section through a cable used in the stator winding in an embodiment example of the invention.

In FIG. 9, an advantageous embodiment example of the stator winding of the generator is illustrated. The stator is wound with high-voltage cable and the figure is a cross-section through such a one. The cable consists of a core having one or more wire conductors 31 of copper. The core is surrounded by an inner semiconducting layer 32. Outside this, a layer of solid insulation 33 is arranged, e.g., PEX insulation. Around the insulation, an outer semiconducting layer 34 is arranged. Each one of the semiconducting layers forms an equipotential surface.

The figures that have been described above are schematic in that, for the understanding of the invention, less important details are omitted with the purpose of emphasizing the specific aspects significant for the invention.

Normally, an assembly according to the invention has a size Corresponding to a turbine diameter of 2-10 m. However, in local energy supply to just one or a few users, smaller sizes in the range of a rotor diameter of 0.5-2 m may be considered. In certain applications, such as, e.g., far out on the sea in the Gulf Stream, very large dimensions may be considered, having a rotor diameter of up to 100 m.

The invention claimed is:

1. An assembly which comprises:
   a rotary electrical generator which defines an imaginary axis therethrough and which includes a rotor and a stator, and
   a turbine which is spaced from the generator along said imaginary axis and which includes at least three axially-extending blades, each of said at least three blades being directly connected to said rotor.

2. The assembly according to claim 1, wherein the turbine comprises a first axial group of blades directed towards a first direction from the rotor and a second group of blades directed towards an opposite axial direction from the rotor, each group comprising at least 3 blades.

3. The assembly according to claim 2, wherein each blade in the first group is arranged in coalignment with a blade in the second group.

4. The assembly according to claim 3, wherein blades located in coalignment are directly mechanically connected to each other.

5. The assembly according to claim 1, wherein each blade is stayed by stay means.

6. The assembly according to claim 5, wherein the stay means comprises elements that connect blades to each other.

7. The Assembly according to claim 6, wherein the stay means comprises an element directed radially inward from the respective blade, a radially innermost end of each element being connected to each other.

8. The assembly according to claim 6, wherein the stay means comprises elements extending between each blade adjacent in the circumferential direction.

9. The Assembly according to claim 1, wherein each blade is connected to the rotor via a joint device.

10. The assembly according to claim 1, wherein the rotor comprises permanent magnets.

11. The assembly according to claim 1, wherein the stator is encapsulated in a waterproof house.

12. The assembly according to claim 1, wherein the rotor is situated radially outside the stator and in the same axial plane as the stator.

13. The assembly according to claim 1, wherein the stator is wound with a high-voltage cable provided with a core of conducting material, a first layer of semiconducting material surrounding the conducting material, a layer of insulating material surrounding the first layer and a second layer of semiconducting material surrounding the insulating material.

14. The assembly according to claim 1, wherein the stator of the generator is rotatable and connected to a turbine arranged to rotate the stator in the opposite direction to the rotor.

15. The assembly according to claim 1, wherein the stator is wound for three-phase.

16. A method of generating electric current which comprises the steps of:
    providing an assembly comprising an rotary electrical generator which includes a rotor and which defines an imaginary axis therethrough, and a turbine which is axially offset from said generator along said imaginary axis and which comprises at least three axially-directed blades, each blade being individually directly connected to the rotor of the generator, and
    placing said assembly in an underwater current.

* * * * *